United States Patent
Woodward

(10) Patent No.: US 8,832,376 B2
(45) Date of Patent: Sep. 9, 2014

(54) SYSTEM AND METHOD FOR IMPLEMENTING A LOW-COST CPU CACHE USING A SINGLE SRAM

(75) Inventor: Patrice Woodward, Bristol (GB)

(73) Assignee: Infineon Technologies AG, Neubiberg (DE)

(*) Notice: Subject to any disclaimer, the term of this patent is extended or adjusted under 35 U.S.C. 154(b) by 203 days.

(21) Appl. No.: 13/422,365

(22) Filed: Mar. 16, 2012

(65) Prior Publication Data

US 2013/0246696 A1    Sep. 19, 2013

(51) Int. Cl.
G06F 12/08    (2006.01)
(52) U.S. Cl.
CPC .................. *G06F 12/0811* (2013.01)
USPC ......................................................... 711/122
(58) Field of Classification Search
CPC ................................................... G06F 12/0811
See application file for complete search history.

(56) References Cited

U.S. PATENT DOCUMENTS

| | | | |
|---|---|---|---|
| 5,761,708 A * | 6/1998 | Cherabuddi et al. ........... | 711/118 |
| 5,813,031 A * | 9/1998 | Chou et al. ..................... | 711/122 |
| 6,212,602 B1 * | 4/2001 | Wicki et al. .................... | 711/122 |
| 6,539,457 B1 * | 3/2003 | Mulla et al. .................... | 711/131 |
| 7,404,040 B2 | 7/2008 | Ronciak et al. | |
| 2011/0131381 A1 | 6/2011 | Kaplan | |
| 2013/0046934 A1 * | 2/2013 | Nychka et al. ................ | 711/119 |

* cited by examiner

*Primary Examiner* — Hiep Nguyen
(74) *Attorney, Agent, or Firm* — Eschweiler & Associates, LLC

(57) ABSTRACT

One embodiment of the present invention relates to a CPU cache system that stores tag information and cached data in the same SRAM. The system includes an SRAM memory device, a lookup buffer, and a cache controller. The SRAM memory device includes a cache data section and a cache tag section. The cache data section includes data entries and the tag section includes tag entries associated with the data entries. The tag entries include memory addresses that correspond to the data entries. The lookup buffer includes lookup entries associated with at least a portion of the data entries. The number of lookup entries is less than the number of tag entries. The cache controller is configured to perform a speculative read of the cache data section and a cache check of the lookup buffer simultaneously or in a single cycle.

20 Claims, 7 Drawing Sheets

SYSTEM AND METHOD FOR IMPLEMENTING A LOW-COST CPU CACHE USING A SINGLE SRAM

BACKGROUND OF THE INVENTION

A memory cache, or more particularly, a CPU cache is a small, fast memory used by a central processing unit of a computer to reduce the average time to access memory. In contrast, regular or main memory is a relatively large memory, but is slow in comparison to the cache memory. The cache "caches" or stores copies of data from frequently used memory locations, thereby providing faster access to the frequently used memory locations.

In CPU cache systems, most memory accesses are from cached memory locations. As a result, an average latency of memory accesses can be closer to a latency of the cache memory than the latency of the main memory. Latency is essentially a delay between a CPU requesting a memory access (read or write) and the access completing. Latency is typically measured in bus cycles.

Cache memory works well for many applications. However, the cache memory and controls needed to access it can add considerable expense to a device. As a result, a designer may forego using cache memory in a product or device in order to reduce cost. This can cause the device or product to operate much slower than a similar device or product that incorporates a cache memory.

DETAILED DESCRIPTION OF THE INVENTION

Figure 1:
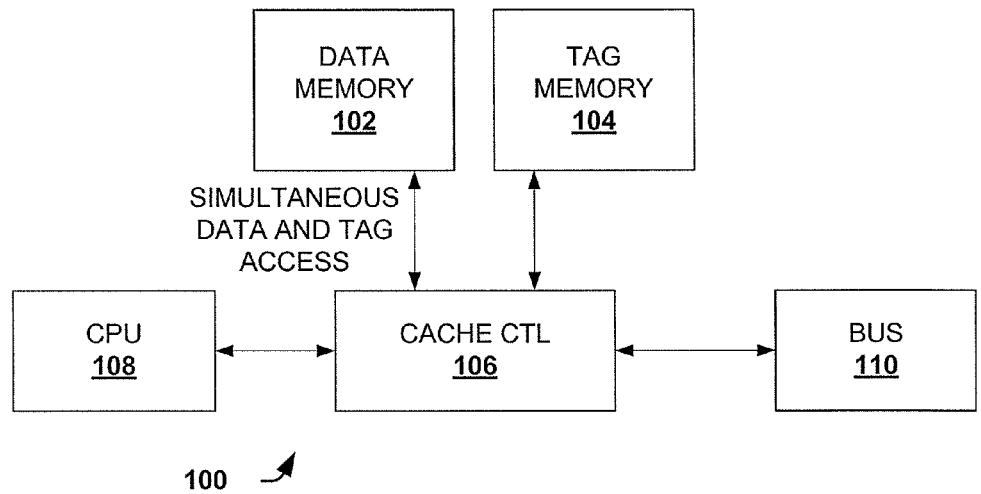
FIG. 1 is a block diagram illustrating an example of a two memory cache system.

The present invention will now be described with reference to the attached drawing figures, wherein like reference numerals are used to refer to like elements throughout, and wherein the illustrated structures and devices are not necessarily drawn to scale.

FIG. 1 is a block diagram illustrating a typical example of a two memory cache system 100. The system 100 includes a CPU 108, a cache controller 106, a system bus 110, a data memory 102, and a tag memory 104. The system 100 is typically a 2-way or 4-way set associative cache that uses two SRAMs, the data memory 102 and the tag memory 104. The data memory 102 and the tag memory 104 are typically implemented as 16-byte or 32-byte cache lines.

The data memory 102 stores cached data items. The tag memory 104 stores an address of each cache line stored in the data memory. The addresses are referred to as tags because they are used by the cache controller 106 to determine if a data item is currently in the data memory 102 or not.

During operation, the CPU 108 requests a data item from memory. In response, the cache controller 106 simultaneously accesses (both reads and writes) both the data memory 102 and the tag memory 104. When both reads are complete, the cache controller 106 checks the read tag line from the tag memory 104 to determine whether the requested data item is available in the cache memory. If the requested data is present, the access is marked as a cache hit and the cache controller 106 sends the requested data to the CPU 108 in the same cycle. If the requested data is not present, the access is not marked as a cache hit and is referred to as a cache miss. In this situation, the requested data item is fetched from a main memory (not shown) via the bus 110. For the cache miss, multiple bus cycles are required to provide the data to the CPU 108. Store operations to cacheable memory work in a similar manner.

By using two SRAMs, the controller 106 accesses the tags and speculatively read data in the same cycle. This provides suitable performance, however this approach can be expensive in terms of cost and/or silicon area. For example, each SRAM includes a substantial amount of silicon overhead introduced by its control and testing logic.

It is appreciated that many CPUs include a local memory mapped SRAM, which is used as a scratchpad memory. This memory, also referred to as scratchpad or scratchpad RAM, is a high-speed internal memory used for temporary storage of calculations, data, and/or other work in progress.

The present invention provides performance somewhat similar to that of a two memory cache system, but at a lower cost, including lower hardware costs and less resources. The present invention utilizes a single SRAM that can be shared with the CPU's scratchpad memory. The single SRAM combines the tag information and data information. A relatively small lookup buffer is utilized to store a number of TAG entries associated with recently used cache lines.

Figure 2:
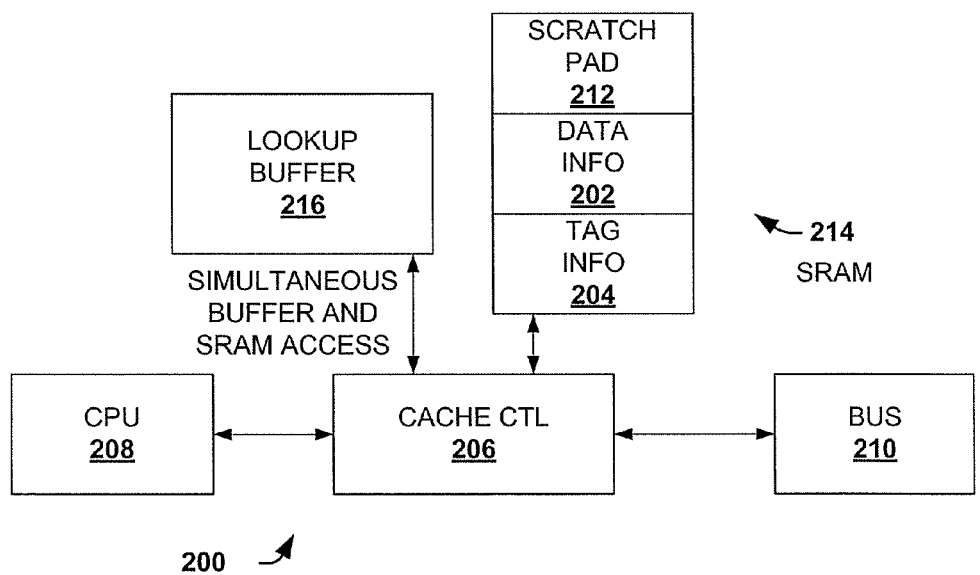
FIG. 2 is a block diagram illustrating a memory cache system that utilizes a shared memory in accordance with an embodiment of the invention.

FIG. 2 is a block diagram illustrating a memory cache system 200 that utilizes a shared memory in accordance with an embodiment of the invention. The system 200 includes a CPU 208, a cache controller 206, a system bus 210, a lookup buffer 216 and a shared SRAM 214.

The shared SRAM 214 is a shared memory that can be utilized for a variety of purposes. In this example, the shared SRAM 214 includes a tag info section 204, a data info section 202, and a scratchpad 212. The data info section 202 stores cached data items by lines. The data section 202 can store data in one way, two way, four way, and the like manners. The tag section 204 stores an address of each cache line stored in the data section 202.

The lookup buffer 216 operates as a small direct mapped cache that stores recent address or tags to recently accessed data. The number of entries present in the lookup buffer 216 can vary by implementation. In one example, the number of entries in the lookup buffer is 8. In another example, the lookup buffer stores the 8 most recently accessed addresses or tags in the data section 202.

The cache controller 206 interacts with the CPU 208 and the bus via a CPU interface and a bus interface, respectively. The CPU 208 issues memory accesses (read and write accesses) to the cache controller 206. Non-cacheable accesses are redirected by the controller 206 to either the scratchpad 212 or the bus 210.

For a memory access, the lookup buffer 216 and the data section 202 of the SRAM 214 are accessed simultaneously utilizing an address for the memory access. The SRAM 214 is accessed speculatively. If the address matches a tag in the lookup buffer 216 (a tag buffer hit) and the data was correctly speculated, the data is written or returned to the CPU 208. If the address does not match a tag in the lookup buffer 216 (a tag buffer miss), the tag info section 204 is accessed during a next cycle. If the address matches a tag in the tag section 204 (a tag section hit or cache hit), the data is written or returned to the CPU 208. If the address does not match a tag in the tag section 204 (a tag section miss or a cache miss), another memory is accessed via the bus in order to retrieve the data. In the event of a tag buffer miss or a cache miss, the data, when retrieved from the bus 210, is added to the data info section 202 and the address is added to the tag info section 204 and the lookup buffer section. In the event of a tag buffer miss and a cache hit, the address is added to the tag buffer 216.

Figure 3:
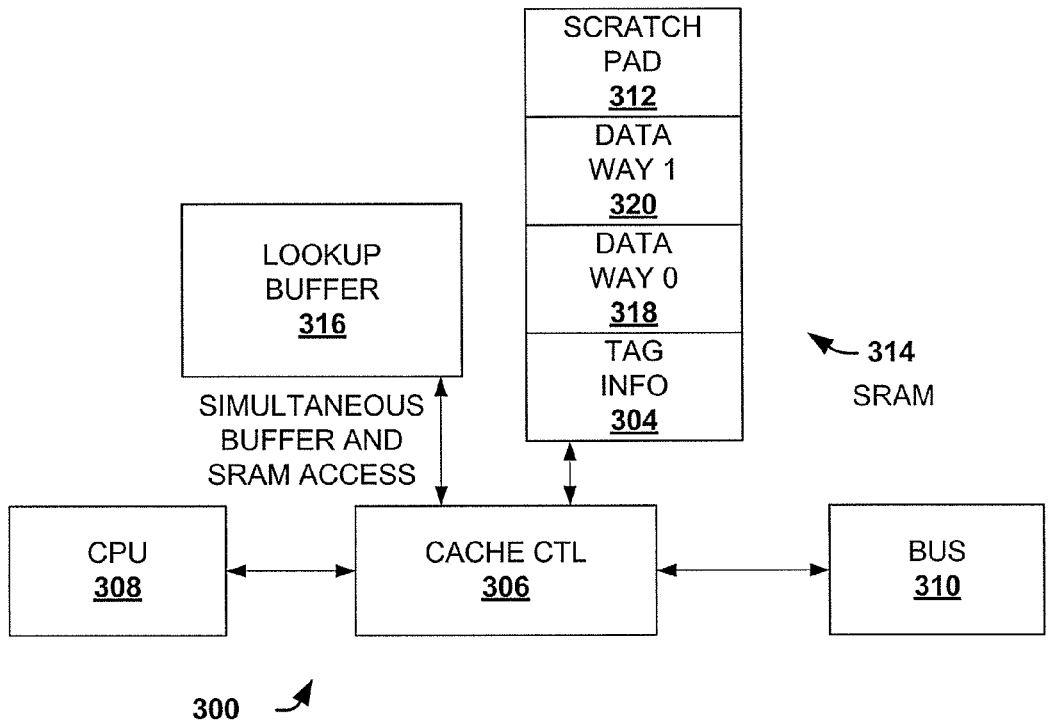
FIG. 3 is a block diagram illustrating a memory cache system that utilizes a shared memory in accordance with an embodiment of the invention.

FIG. 3 is a block diagram illustrating a memory cache system 300 that utilizes a shared memory in accordance with an embodiment of the invention. The system 300 includes a CPU 308, a cache controller 306, a system bus 310, a lookup buffer 316 and a shared SRAM 314. The system 300 uses a two way implementation for cache data and includes some specific examples for illustrative purposes. However, it is appreciated that the present invention is not limited to the examples provided below.

The shared SRAM 314 is a shared memory that can be utilized for a variety of purposes. In this example, the shared SRAM 314 includes a tag info section 304, a data info section, and a scratchpad 312. The data info section includes a data way 0 318 and a data way 1 320. The data section stores cached data items by lines. In one example, the data section utilizes 16 Kbytes. The tag section 304 stores an address of each cache line stored in the data section 318 and 320.

The lookup buffer 316 operates as a small direct mapped cache that stores recent address or tags that have been accessed in the data section. In one example, the number of entries in the lookup buffer is 8. In another example, the number of entries in the lookup buffer is 16. In another example, the lookup buffer stores the 8 most recently accessed addresses or tags in the data section 302.

The cache controller 306 interacts with the CPU 308 and the bus via a CPU interface and a bus interface, respectively. The CPU 308 issues memory accesses (read and write accesses) to the cache controller 306. Non-cacheable accesses are redirected by the controller 306 to either the scratchpad 312 or the bus 310.

For a cacheable memory access (read), the lookup buffer 316 and the data sections 318 and/or 320 of the SRAM 314 are accessed simultaneously utilizing an address for the memory access. The SRAM 314 is accessed speculatively. If the address matches a tag in the lookup buffer 316 (a tag buffer hit), the data is written or returned to the CPU 308. If the address does not match a tag in the lookup buffer 316 (a tag buffer miss), the tag info section 304 is accessed during the next cycle. If the address matches a tag in the tag section 304 (a tag section hit or cache hit), the data is written or returned to the CPU 308. If the address does not match a tag in the tag section 304 (a tag section miss or a cache miss), another memory is accessed via the bus in order to retrieve the data. In the event of a tag buffer miss or a cache miss, the data, when retrieved from the bus 310, is added to the data info section and the address is added to the tag info section 304 and the lookup buffer section. In the event of a tag buffer miss, but a cache hit, the address is added to the tag buffer 316.

The SRAM 314 stores both cache controller information (data+tags) and scratchpad information. In one example, the SRAM word width is 8 bytes and it is writable with a granularity of 16-bit words. The address map for cache data 302 and scratchpad data 312 is little endian following a natural linear order for the word addresses.

The split between scratchpad 312 and cache (includes data 318 and 320 and tag 304) is implemented by means of 3 contiguous data frames (buffers): cdata_frm0, cdata_frm1 and ctag. The following table provides a description of these 3 frames. Any SRAM word not belonging to any of the following data frames can be considered to be sitting in the scratchpad 312 space. An attempt to access any of the cache frames as part of the scratchpad memory is not allowed and will result in an error.

Note that an index is defined as the address of the CPU access modulo half the cache size and divided by the line size (32). This corresponds to an index definition for a conventional 2-way set associative cache.

| Frame name | Description | Start address | Size |
|---|---|---|---|
| ctag | Tag information for both ways of all indices. Each 8-byte entry contains the standard tag information for both ways of the corresponding index. Also contains a valid bit for both ways of the current index. | ctag_base | 256 * 8 bytes (8 bytes per index) |
| cdata_frm0 | Contains 256 32-byte lines of cached data for way 0. The cache lines are stored linearly by cache index. For each index there are 32 bytes of cached data arranged in 4 8-byte words. | cdata_base0 | 256 * 32 bytes (32-bytes per index) |
| cdata_frm1 | Contains 256 32-byte lines of cached data for way 1. The cache lines are stored linearly by cache index. For each index there are 32 bytes of cached data arranged in 4 8-byte words. | cdata_base1 | 256 * 32 bytes (32-bytes per index) |

Continuing the example, the arrangement of tag information in an entry of ctag is described. For a given index, a corresponding 8-byte word in memory contains the higher part of the cached line address and the corresponding bit for both ways, assuming a two way cache implementation. When a cache line is stored in the cache (SRAM 314) bits 31 down to 13 of its address is stored in the ctag entry corresponding to the index indicated by bits 12 down to 5 of the address.

| tag_address_way1 [31:13] | | Val1 | | tag_address_way0 [31:13] | | Val0 |
|---|---|---|---|---|---|---|
| 63 | | 45 | 32 31 | | 13 | 0 |

In this example, a 16 Kbyte 2-way cache is used. 8 Kbyte of the cache data is stored in cdata_base0 (data way 0 318) and 8 Kbyte is stored in cdata_base1 (data way 1 320). The cdata_base0 and cdata_base1 frames are addressed linearly by a cache index. There are 256 indices in a 16 Kbyte 32-byte line cache. Therefore, for each cache index from 0 to 255, both frames allocate 32-bytes of data representing the cached data line.

Figure 4A:
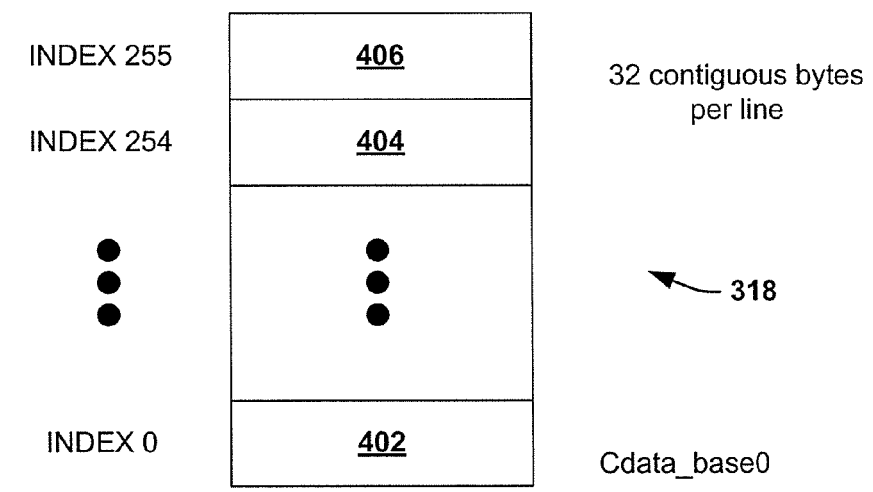
FIGS. 4A and 4B are diagrams illustrating an example mapping of cached lines in accordance with an embodiment of the invention.

FIG. 4A is a diagram illustrating an example mapping 400 of cached lines for a first way in accordance with an embodiment of the invention. The mapping 400 includes the 256 lines and corresponding index values. Entry 402 corresponds to index 0 (cdata_base0) and entries 404 and 406 correspond to index 254 and 255, respectively. Each line or entry includes 32 contiguous bytes. The mapping 400 is for data stored in a first way (way 0), such as the first way section 318 of FIG. 3.

Figure 4B:
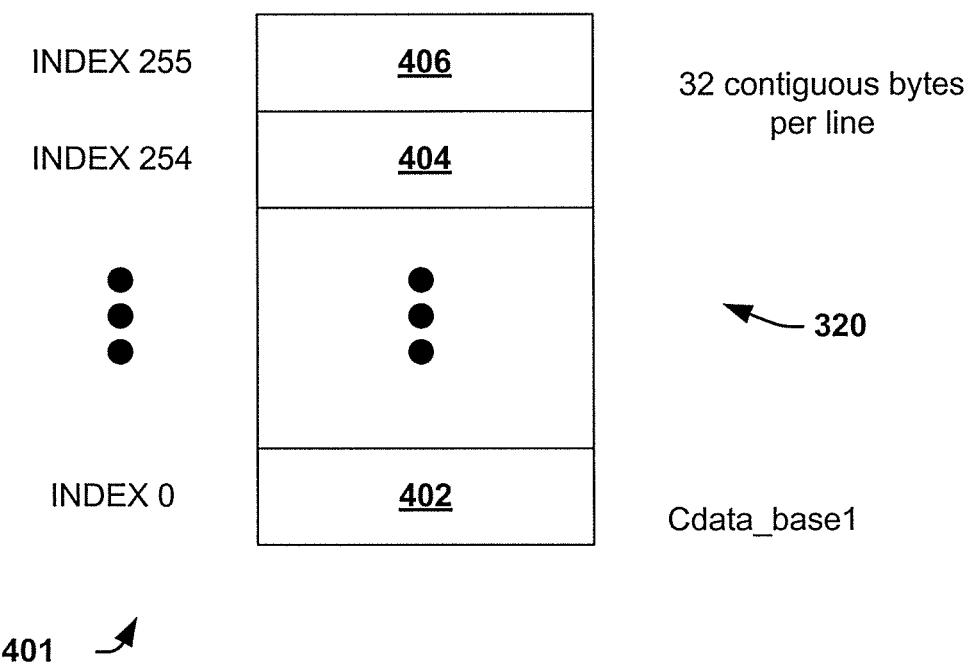

FIG. 4B is a diagram illustrating an example mapping 401 of cached lines for a second way in accordance with an embodiment of the invention. The mapping 401 is for data stored in a second way (way 1), such as the second way section 320 of FIG. 3. The mapping 401 includes 256 lines and corresponding index value. Entry 402 corresponds to index 0 (cdata_base1) and entries 404 and 406 correspond to index 254 and 255, respectively. Each line includes 32 contiguous bytes.

Returning to FIG. 3, the lookup buffer 316 is a small structure implemented with standard cell registers. As stated above, it operates as a tag cache holding recent CPU addresses that have resulted in a cache hit or a refill. The lookup buffer 316 operates as an 8-entry direct mapped cache for tag entries. The buffer 316 holds the address of a cached line and also its valid bit, which indicates it is stored in the cache. Each entry also includes the cache way in which the line is stored. It is noted that the tag information for each entry in the lookup buffer 316 has more bits given that the number of indices in the lookup buffer 316 is smaller, 8 in this example. The full address of a 32-byte cache line is computed from the tag value and the index into the lookup buffer 316.

A suitable structure for the lookup buffer 316 is shown below.

| line_addr_tag[31:8] (entry 7) | WAY | VAL |
|---|---|---|
| line_addr_tag[31:8] (entry 6) | WAY | VAL |
| line_addr_tag[31:8] (entry 5) | WAY | VAL |
| line_addr_tag[31:8] (entry 4) | WAY | VAL |
| line_addr_tag[31:8] (entry 3) | WAY | VAL |
| line_addr_tag[31:8] (entry 2) | WAY | VAL |
| line_addr_tag[31:8] (entry 1) | WAY | VAL |
| line_addr_tag[31:8] (entry 0) | WAY | VAL |

As stated above, the lookup buffer 316 is accessed on any CPU 308 access. If a required address matches a line address for a corresponding buffer entry, then the access is marked as a hit. The WAY field informs the cache controller 306 which way in the data section 318 or 320, the requested or required cache line information is in.

On a cache refill, new tag information is copied into both the lookup buffer 316 and into a relevant entry in a ctag frame of the tag section 304. Thus, tags present in the lookup buffer 316 are also present in the tag info section 304.

In this example, the lookup buffer 316 is implemented in registers, which permits simultaneous access of the lookup buffer 316 and the SRAM 314. However, it is appreciated that other embodiments can implement the lookup buffer 316 is some other suitable manner.

The cache controller 306 is responsible for managing the content of the SRAM 314 and the lookup buffer 316. The cache controller 306 also issues bus requests to copy missing information into the cache, which is referred to as a refill. The cache controller 306 ignores scratchpad 312 related accesses. In one example, a separate scratchpad manager (not shown) handles scratchpad 312 related accesses.

An example of a suitable lookup strategy for use by the cache controller 306 is presented below. A primary cache hit is defined as a memory access that has a "hit" in the lookup buffer 316. A secondary cache hit is defined as a memory access that has a "hit" in the ctag information section 304 of the SRAM 314 but not in the lookup buffer. In operation, the cache controller 306 looks up the address of a memory request in the lookup buffer 316 first. The cache controller 306 looks up the address in the tag information section 304 if the address was not found in the lookup buffer 316, this is referred to as lookup buffer miss. When the cache controller 306 determines that the address is not present in the lookup buffer 316 or the tag section 304, the cache controller 306 initiates a refill. Additionally, the cache controller 306 copies ctags for secondary hits over to the lookup buffer 316 so that the look up buffer 316 is populated with recent hits.

As shown above, the cache data is organized according to two ways by using data way 0 318 and data way 1 320. The tag information in the lookup buffer 316 and in the tag section 304 includes way information. For refill operations, the way information in the lookup buffer 316 is checked and a newly fetched cache line is stored in an opposite way to that of a current entry. This mitigates eviction of relatively recent cache entries and operates as a coarse least recently used (LRU) mechanism in that any cache entry which has been referenced by the CPU 308 recently enough to make its way into the lookup buffer 316 will not be evicted. Of course the current invention does not preclude the use of a full LRU algorithm as implemented on standard cache systems.

The organization of data shown in FIG. 3 does not permit for reading of both ways at the same time. It is appreciated that alternate embodiments of the invention include organization wherein both ways can be read simultaneously. For the organization shown in SRAM 314, the cache controller 306 looks up an address in the lookup buffer 316 on a first cycle. This initial buffer lookup does not require accessing the SRAM 314 so the cache controller 306 will use the first cycle to speculatively access cache data in the SRAM 314 from a "best guess" way. The best guess for the speculative way, in this example, is the same way used for the last cache hit.

The cache controller 306 records which way it has accessed the SRAM 31 so that when it gets the data and the lookup buffer result back, the controller 306 can decide whether the speculation was correct. If correct, the cache controller 306 can complete the access immediately, either returning read data to the CPU or committing store data to the SRAM. If the way guess was incorrect, the cache controller 306 uses an extra cycle to read the data from the SRAM 314 again, but by accessing with the other way.

For this example, the worst case for a cache hit is incurred on a secondary hit where the way guess was incorrect. In such a case, an extra cycle is needed to access the ctag frame or line from the tag section 304 of the SRAM 314 and an extra cycle to access the SRAM 314 data of the correct way.

FIGS. 5A to 5D depict examples of cache controller operation for a memory read in accordance with an embodiment of the invention. The examples are provided with reference to FIG. 3 and system 300. The examples are provided to facilitate an understanding of the invention, however it is appreciated that the present invention contemplates other suitable techniques for operating a cache controller and utilizing a lookup buffer.

Figure 5A:
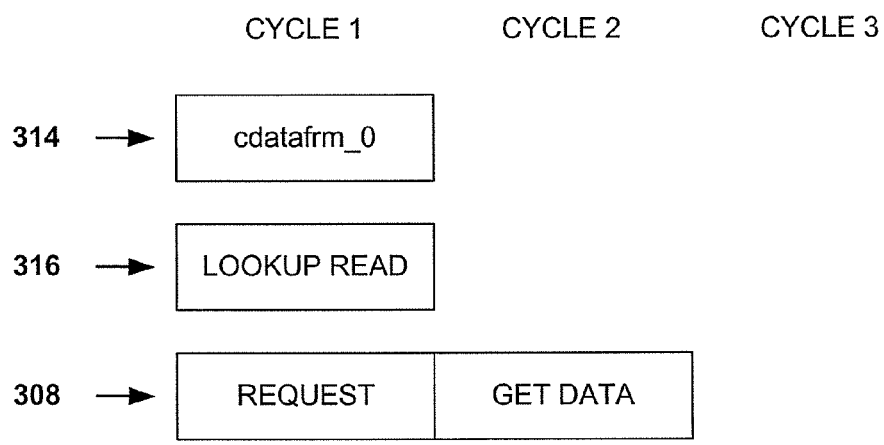
FIGS. 5A to 5D depict examples of cache controller operation for a memory read in accordance with an embodiment of the invention.

FIG. 5A is a diagram showing a first example having a primary hit and a correct way guess. Here, the cache controller 306 receives a memory request from the CPU 308. In the same cycle, the cache controller 306 simultaneously performs a speculative read of the SRAM 314 according to an address and using a best guess for the way and checks the lookup buffer 316 for the address. As shown above, the speculative read only returns data for the guessed way. In this example, the check with the lookup buffer 316 results in a hit, which indicates that the data is present in the SRAM 314. Further, the check also returns the way, which matches the guess for the way. In the second cycle, the data is returned to the CPU 308. In this case, the performance provided is as good as or comparable to a 2-way associative cache system utilizing multiple SRAMs. The latency for the access is one-cycle, with zero penalty when compared with a standard cache system.

Figure 5B:
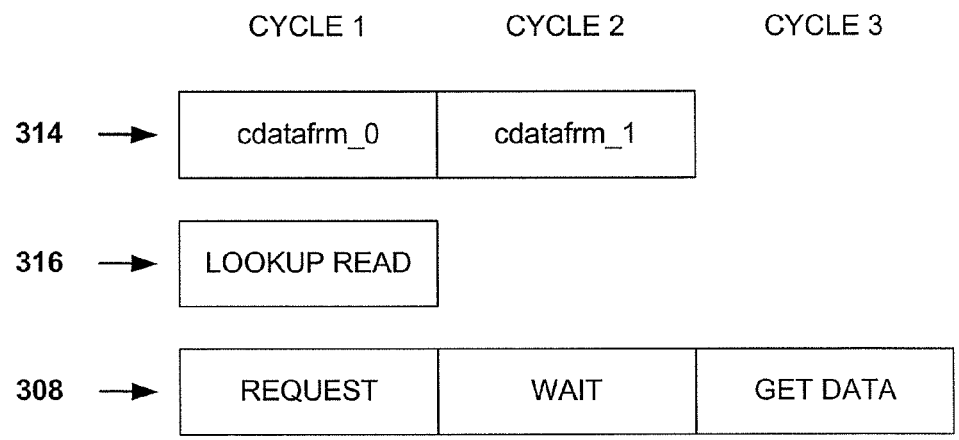

FIG. 5B is diagram showing a second example having a primary hit delayed by an incorrect way guess. Here, the cache controller 306 receives a memory request from the CPU 308. In the same cycle, the cache controller 306 simultaneously performs a speculative read of the SRAM 314 according to an address and using a best guess for the way and checks the lookup buffer 316 for the address. As shown above, the speculative read only returns data for the guessed way. In this example, the check with the lookup buffer 316 results in a hit, which indicates that the data is present in the SRAM 314. However, the check also returns the way, which does not match the guess for the way. In the second cycle, a second read of the SRAM 314 is performed using the other way or the correct way. The CPU 308 has to wait during the second cycle. In the third cycle, the requested data is returned to the CPU 308. When compared with a 2-way associative cache system utilizing multiple SRAMs, similar performance is obtained. In this example, 2 cycles are needed to return the data to the CPU 308. The penalty with relation to a standard cache system is 1 cycle.

Figure 5C:
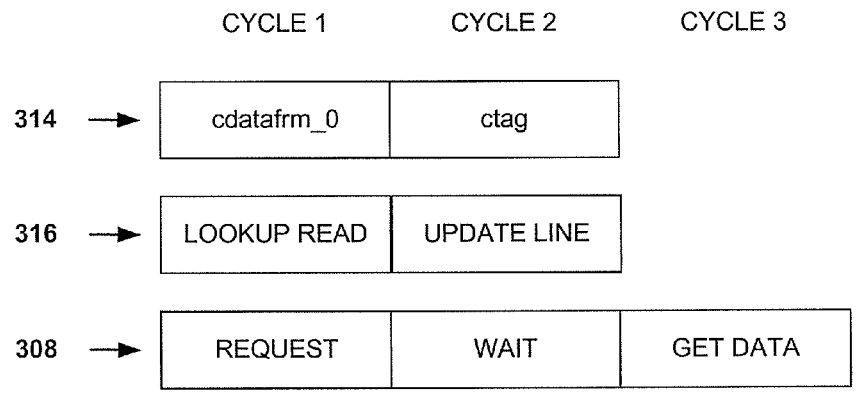

FIG. 5C is another diagram showing a third example having a secondary hit with a correct way guess. Here, the cache controller 306 receives a memory request from the CPU 308. In the same cycle, the cache controller 306 simultaneously performs a speculative read of the SRAM 314 according to an address and using a best guess for the way and checks the lookup buffer 316 for the address. As shown above, the speculative read only returns data for the guessed way. In this example, the check with the lookup buffer 316 results in a miss. In a second cycle, the controller 306 checks the tag information section 304 in the SRAM, which results in a hit. The line for the hit also identifies the way for the address, which in this example matches the way guess. Additionally, the controller also adds or updates the tag information to the lookup buffer 316. The CPU 308 waits during the second cycle. In the third cycle, the speculatively read data from the first cycle is returned to the CPU 308. In this example, 2 cycles are needed to return the data to the CPU 308. The penalty with relation to a standard cache system is 1 cycle.

Figure 5D:
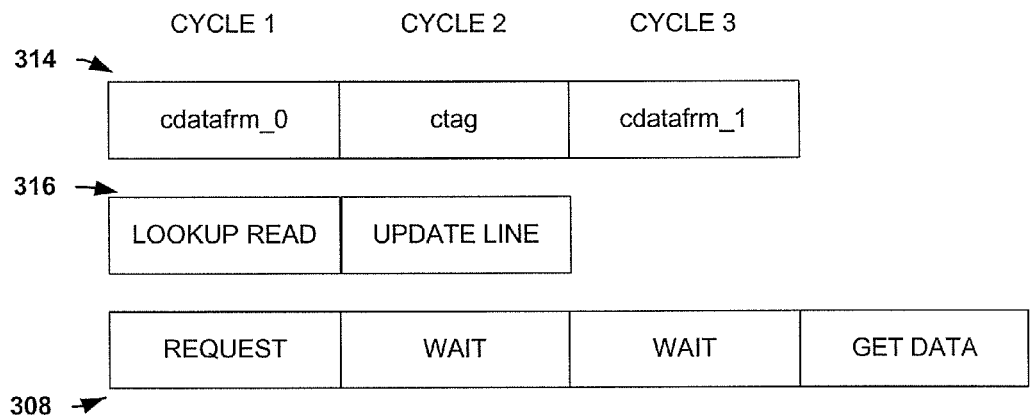

FIG. 5D is yet another diagram showing a fourth example having a secondary hit with an incorrect way guess. Here, the cache controller 306 receives a memory request from the CPU 308. In the same cycle, the cache controller 306 simultaneously performs a speculative read of the SRAM 314 and checks the lookup buffer 316 for the address. The speculative read is performed according to an address and using a guess for the way. The speculative read only returns data for the guessed way. In this example, the check with the lookup buffer 316 results in a miss. In a second cycle, the controller 306 checks the tag information section 304 in the SRAM, which results in a hit. The line for the hit also identifies the way for the address, which, in this example, does not match the way guess. The speculative read data can be discarded or ignored. The controller also adds or updates the tag information to the lookup buffer 316 and the CPU 308 waits during the second cycle. In the third cycle, a second read is performed of the SRAM 314 using the correct way. In the fourth cycle, the read data from the third cycle is returned to the CPU 308. In this example, 3 cycles are needed to return the data to the CPU 308. Penalty=2

It is appreciated that the above examples are provided to illustrate and facilitate understanding of the present invention and that the present invention is not limited to the above examples. Variations are contemplated and in accordance with the present invention.

The following table compares performance of a cache system in accordance with the invention, such as system 300, and a standard 2-way set associative cache. A primary hit indicates a hit in the lookup buffer 316 for the system 300 and a cache hit for the standard cache. A delayed hit indicates a wrong way guess. A secondary hit indicates a miss in the lookup buffer 316 and a hit in the tag section 304 for the system 300. The simulation was run to evaluate the performance of a cache system in accordance with the invention while executing the Dhrystone benchmark. A model of the cache controller was simulated and its Dhrystone performance was compared to that of the same CPU using a standard 2-way set associative cache that requires multiple SRAMs. The simulation was performed using a Dhrystone benchmarking program that mimics performance of processor usage for common programs. It is appreciated that embodiments of the invention can have performance varied from that shown in the below table.

|  | System 300 | Standard cache |
| --- | --- | --- |
| Transactions | 36631 | 36631 |
| Misses (refill) | 81 | 81 |
| Primary hits | 30660 | 36550 |
| Primary hits delayed | 3190 |  |
| Secondary hits | 901 |  |
| Secondary hits delayed. | 1798 |  |

The simulation data shows that the system 300 can provide performance comparable to that of a standard cache without requiring multiple SRAMs to implement the cache system.

Figure 6:
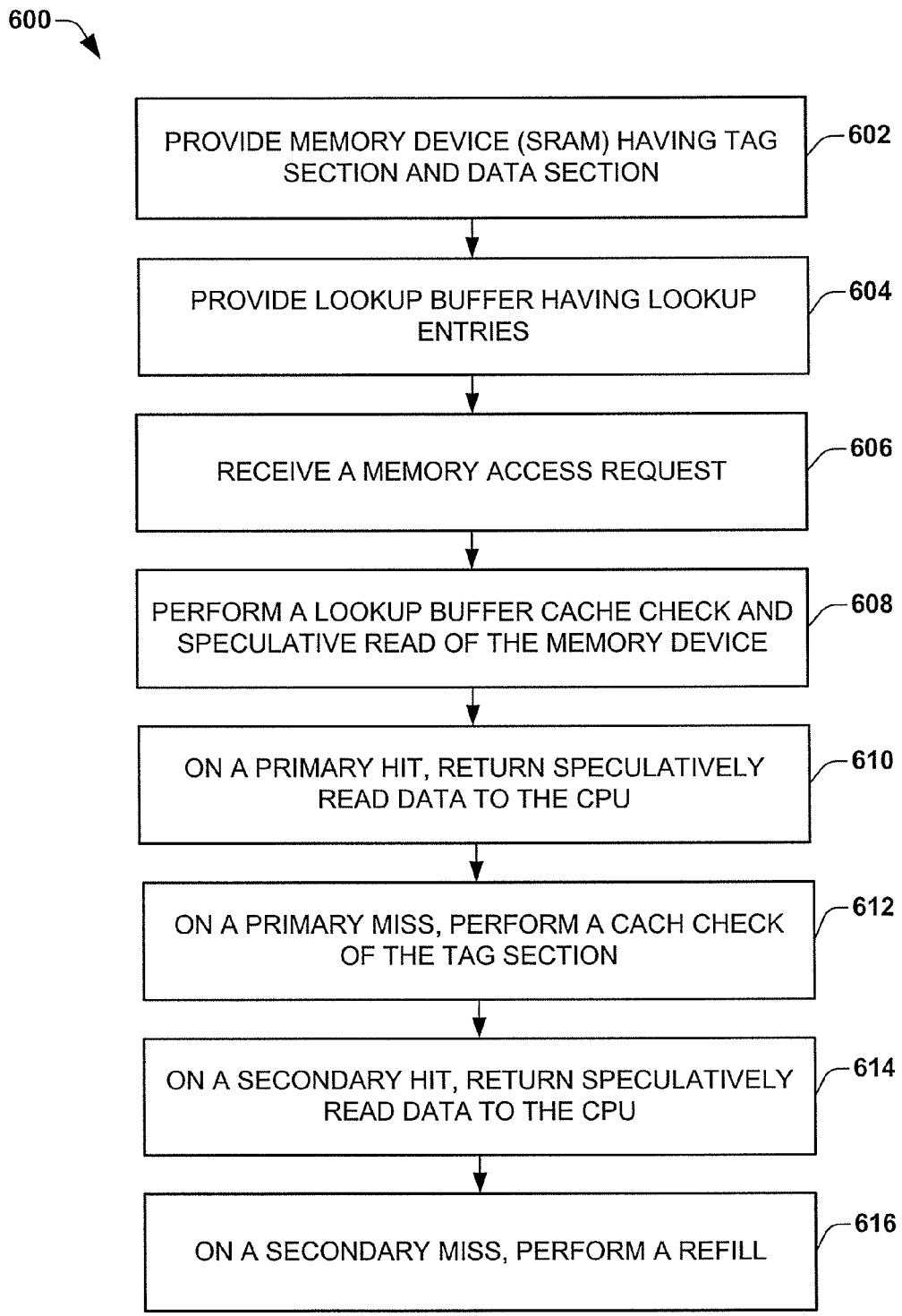
FIG. 6 is a flow diagram illustrating an exemplary method of operating a CPU cache.

FIG. 6 is a flow diagram illustrating an exemplary method 600 of operating a CPU cache. While method 600 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

The method 600 begins at block 602, wherein a memory device having a data section and a tag section is provided. The data section includes data entries and the tag section includes tag entries associated with the data entries. The data entries include a copy of data from another memory device, such as a main memory. The other memory device is typically a slower or higher latency device and consumes more CPU time or cycles in order to access it. The data section can be organized into two or more "ways", as described above. The memory device is a high speed, low latency device, such as an SRAM. It is noted that only a single SRAM or similar memory device is required.

The tag entries are associated with the data entries of the data section. The tag entries include addresses and other information related to the associated data entries. The other information includes, for example, "way" information.

A lookup buffer is provided at block 604. The lookup buffer includes lookup entries, which are typically associated with only a portion of the data entries of the data section. The lookup entries are similar in form to the tag entries. Similarly, the lookup entries also include addresses and other information related to the associated data entries. It is noted that the number of lookup entries present in the lookup buffer is generally less than the number of tag entries present in the tag section.

In one example, the lookup buffer is implemented in a register that permits simultaneous or same cycle access to both the lookup buffer and the memory device. In another example, the lookup buffer is implemented in a second memory device, such as a second SRAM, that also permits simultaneous or same cycle access to both the lookup buffer and the memory device.

A memory access request is received at block 606. The memory access request can include a memory read or write request. The memory access request is provided by a CPU or CPU component, such as shown above. A cache controller receives and responds to the request, as shown above. The cache controller generally attempts to perform the memory access in as few cycles as possible.

A cache check of the lookup buffer and a speculative read of the data section are performed in a single cycle at block 608. The cache check involves referencing the lookup buffer using an address from the memory request. The cache check of the lookup buffer results in a lookup buffer hit, if the entry is found or a lookup buffer miss, if the entry is not found. The lookup buffer hit is also referred to as a primary hit and the lookup buffer miss is also referred to as a primary miss. The speculative read involves reading a line or entry of the data section also according to an address of the memory access. It is noted that the entry is read without knowing whether it is in the data section.

On a lookup buffer hit (primary hit), the speculatively read data is returned to the CPU at block 610. A use for the entry in the lookup buffer can be marked to track usage.

On a lookup buffer miss (primary miss), a cache check of the tag section of the memory device is performed at block 612 in a next cycle. The cache check references the tag section of the memory device with the address of the memory access request. If the address matches a tag entry, then there is a tag section hit. If the address does not match a tag entry, then there is a tag section miss. The tag section hit is also referred to as a secondary hit and the tag section miss is also referred to as a secondary miss.

On the secondary hit, the speculatively read data is returned to the CPU and the matching tag entry is added to the lookup buffer at block 614. The new entry replaces an oldest entry in the lookup buffer.

On primary and secondary misses, a refill operation is initiated at block 616 wherein the data is read from another memory and is added to the data section and the address is added to the lookup buffer and the tag section as lookup and tag entries, respectively.

It is also noted that alternate embodiments and variations can include checking "way" information, as described above. A miss on the way information is referred to as "delayed" for primary or secondary operations.

The method 600 is described with the lookup buffer, the data section and the tag section including entries. However, it is appreciated that initially, these components are empty until refills and misses cause the lookup buffer, the data section and the tag section to become populated with entries or lines.

Also, it is noted that the above method 600 is described with reference to read memory operations. However, it is appreciated that the method 600 can be extended to write operations.

Figure 7:
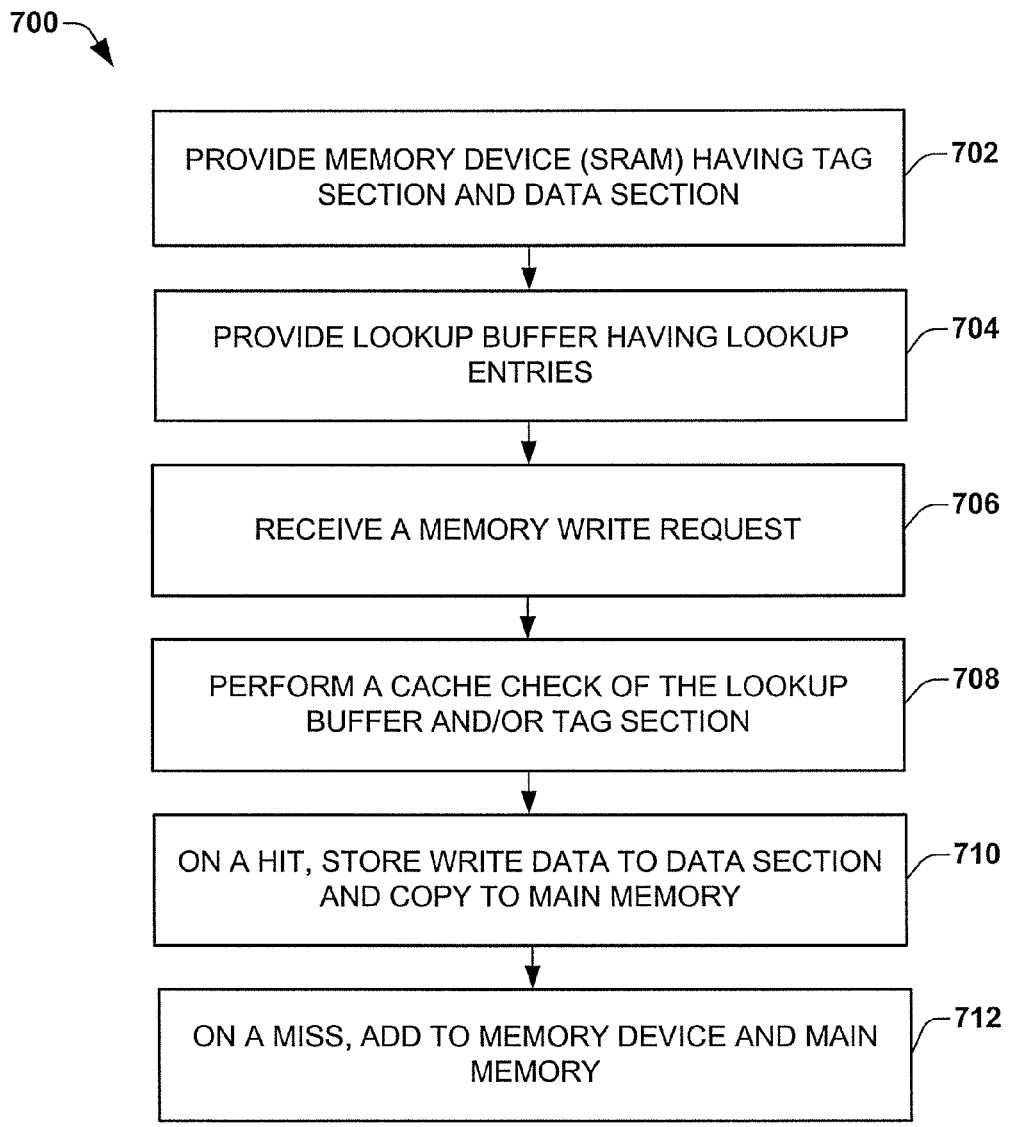
FIG. 7 is a flow diagram illustrating an exemplary method of operating a CPU cache for a write operation.

FIG. 7 is a flow diagram illustrating an exemplary method 700 of operating a CPU cache for a write operation. While method 700 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

The method 700 begins at block 702, wherein a memory device having a data section and a tag section is provided. The data section includes data entries and the tag section includes tag entries associated with the data entries. The data entries include a copy of data from another memory device, such as a main memory. The other memory device is typically a slower or higher latency device and consumes more CPU time or cycles in order to access it. The data section can be organized into "ways", as described above. The memory device is a high speed, low latency device, such as an SRAM. It is noted that only a single SRAM or similar memory device is required.

The tag entries are associated with the data entries of the data section. The tag entries include addresses and other information related to the associated data entries. The other information includes, for example, "way" information.

A lookup buffer is provided at block 704. The lookup buffer includes lookup entries, which are typically associated with only a portion of the data entries of the data section. The lookup entries are similar in form to the tag entries. Similarly, the lookup entries also include addresses and other information related to the associated data entries. It is noted that the number of lookup entries present in the lookup buffer is generally less than the number of tag entries present in the tag section.

A memory write request is received at block 706. The memory write request is provided by a CPU or CPU component, as shown above. The memory write request includes a write address and write data. The memory controller can send an acknowledgement to the CPU, which can then move to a different instruction or operation.

A cache check of the tag section of the memory device is performed at block 708. The tag entries are analyzed or compared with the write address to determine if the address is present in the tag section. The write data can be placed into a temporary storage, such as a store register.

It is noted that variations of the method 700 can perform a cache check of the lookup buffer as well or before performing the cache check of the tag section. For a write operation, a speculative read is not performed, so the memory device may be available for use. However, some implementations may not have the memory device available and, instead perform a cache check of the lookup buffer prior to performing a cache check of the tag section of the memory device.

On a cache hit, the write data is stored in the associated data entry for the matching tag entry at block 710. Typically, the write data is copied from the store register into the associated data entry. However, other suitable mechanisms can be employed. The write data may also copied to main memory at the memory location specified in the write address. In one example, a write through mechanism is utilized where the write data is systematically copied to the main memory via the bus. In another example, a write back mechanism is utilizes where the write data is only updated to the associated data entry in the data section of the memory device. Then, the associated data entry is only copied to the main memory when the associated data entry is evicted from the cache.

On a cache miss, the write address is identified in main memory and is stored in the memory device and main memory at block 712. The write address is also added to the lookup buffer. In one example, the memory location in main memory is identified on the miss and is copied to the tag and data sections of the memory device. Then, the write data is stored in the data section associated with the tag entry. As shown above, the write data can also be copied the main memory.

The method 700 and variations thereof can also be utilized with the above embodiments shown in FIGS. 2 and 3.

It is appreciated that the claimed subject matter may be implemented as a method, apparatus, or article of manufacture using standard programming and/or engineering techniques to produce software, firmware, hardware, or any combination thereof to control a computer to implement the disclosed subject matter (e.g., the circuits or systems shown in FIGS. 2-5, etc., are non-limiting examples of circuits that may be used to implement method 600). The term "article of manufacture" as used herein is intended to encompass a computer program accessible from any computer-readable device, carrier, or media. Those skilled in the art will recognize many modifications may be made to this configuration without departing from the scope or spirit of the claimed subject matter.

One embodiment of the present invention relates to a cache system for memory that stores address or tag information and data in the same SRAM. The system includes an SRAM memory device, a lookup buffer, and a cache controller. The SRAM memory device includes a cache data section and a cache tag section. The cache data section includes data entries and the tag section includes tag entries associated with the data entries. The tag entries include memory addresses that correspond to the cache lines containing data entries. The lookup buffer includes lookup entries which operate as tags associated with at least a portion of the data entries. The number of lookup entries is less than the number of tag entries. The cache controller is configured to perform a speculative read of the cache data section and a cache check of the lookup buffer simultaneously or in a single cycle.

Another embodiment of the invention includes a cache system including a single memory device, a lookup buffer and a cache controller. The single memory device includes a first way data section, a second way data section and a cache tag section. The first way data section includes first way data entries. The second way data section includes second way data entries. The tag section includes tag entries associated with the first way and second way data entries. The lookup buffer includes lookup entries associated with at least a portion data pertaining to the first way and second way data entries. The lookup entries are similar to TAGs in nature. The number of lookup entries is less than the number of tag entries. The cache controller performs a speculative read of the memory device and a cache check of the lookup buffer in a single cycle.

Another embodiment of the invention includes a method of operating a CPU cache. A memory device having a tag section and a data section is provided. Additionally, a lookup buffer is provided. A memory request is received. A lookup buffer cache check of the lookup buffer is performed and a speculative read of the memory device is performed. On a primary hit, the speculatively read data is returned to the CPU. On a primary miss, a cache check of the tag section is performed. On a secondary hit, the speculatively read data is returned to the CPU. On the secondary miss, a refill operation is performed.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A cache system comprising:
    an SRAM memory device including a cache data section and a cache tag section, wherein the cache data section includes data entries and the tag section includes tag entries associated with the data entries;
    a lookup buffer having lookup entries associated with the data entries, wherein the number of lookup entries is less than the number of tag entries; and
    a cache controller configured to perform a speculative read of the cache data section and a cache check of the lookup buffer simultaneously and to obtain speculated data from the cache data section in the same cycle as the cache check.

2. The system of claim 1, wherein the cache data section includes a plurality of data sections.

3. The system of claim 1, wherein the number of tag entries of the cache tag section is selected to result in primary or secondary hits for most memory requests.

4. The system of claim 1, wherein the cache controller is configured to perform a cache check of the tag section on a lookup buffer cache check miss.

5. The system of claim 4, wherein the cache controller is configured to add a tag entry of the tag section to the lookup buffer on the lookup buffer cache check miss and a tag section cache check hit.

6. The system of claim 1, wherein the lookup buffer is located in a system register that can be accessed with the SRAM memory device in the same cycle.

7. The system of claim 1, wherein the SRAM memory device further includes a scratchpad.

8. The system of claim 1, wherein the cache controller is configured to perform a refill of the lookup buffer, the data section, and the tag section on a lookup buffer cache check miss and a tag section cache check miss.

9. The system of claim 1, wherein the cache controller is configured to perform the cache check of the lookup buffer in response to a memory access request from a CPU.

10. The system of claim 9, wherein the cache controller is configured to perform a speculative read of the cache data section in response to the memory access request.

11. The system of claim 10, wherein the cache controller is configured to return data from the speculative read on a primary hit.

12. The system of claim 10, wherein the cache controller is configured to return data from a main memory on a primary miss and a secondary miss.

13. A cache system comprising:
a single memory device including a first way data section, a second way data section and a cache tag section, wherein the first way data section includes first way data entries, the second way data section includes second way data entries, and the tag section includes tag entries associated with the first way and second way data entries;
a lookup buffer having lookup entries associated with the first way and the second way data entries, wherein the number of lookup entries is less than the number of tag entries; and
a cache controller configured to perform a speculative data read for the memory device and a cache check of the lookup buffer in a single cycle and to obtain speculated data from the memory device in the same cycle as the cache check.

14. The system of claim 13, wherein the speculative data read includes a read of the first way data section or the second way data section according to a guess.

15. The system of claim 13, wherein the single memory device is a high speed SRAM.

16. The system of claim 13, wherein the cache controller is configured to perform a second data read for the memory device on a way miss.

17. The system of claim 16, wherein the second data read is performed in a second cycle.

18. A method of operating a CPU cache, the method comprising:
providing a single SRAM having a data section including data entries and a tag section including tag entries;
providing a lookup buffer with lookup entries associated with a portion of the data entries;
receiving a memory access request; and
performing a cache check of the lookup buffer and a speculative read of the data section in a single cycle and to obtain speculated data from the cache data section in the single cycle as the cache check.

19. The method of claim 18, further comprising determining a lookup buffer cache check miss from the cache check of the lookup buffer and performing a cache check of the tag section on the lookup buffer cache check miss.

20. The method of claim 19, further comprising replacing an oldest entry of the lookup buffer on the lookup buffer cache check miss.

* * * * *